(12) United States Patent
Cui et al.

(10) Patent No.: US 9,713,797 B2
(45) Date of Patent: Jul. 25, 2017

(54) DEVICE AND METHOD THEREOF FOR RE-AERATION OF WETLANDS

(71) Applicant: Research Institute of Forestry New Technology, Chinese Academy of Forestry, Beijing, Haidian District (CN)

(72) Inventors: Lijuan Cui, Beijing (CN); Xinsheng Zhao, Beijing (CN); Wei Li, Beijing (CN); Manyin Zhang, Beijing (CN); Yinru Lei, Beijing (CN)

(73) Assignee: Research Institute of Forestry New Technology, Chinese Academy of Forestry, Beijing (CN)

( * ) Notice: Subject to any disclaimer, the term of this patent is extended or adjusted under 35 U.S.C. 154(b) by 0 days.

(21) Appl. No.: 15/008,224

(22) Filed: Jan. 27, 2016

(65) Prior Publication Data
US 2016/0279584 A1 Sep. 29, 2016

(30) Foreign Application Priority Data
Mar. 24, 2015 (CN) .......................... 2015 1 0130625

(51) Int. Cl.
*B09C 1/00* (2006.01)
*B01F 3/06* (2006.01)
(Continued)

(52) U.S. Cl.
CPC .............. *B01F 3/068* (2013.01); *A01B 1/243* (2013.01); *A01B 45/02* (2013.01); *B09C 1/00* (2013.01);
(Continued)

(58) Field of Classification Search
CPC B09C 1/00; B09C 1/002; B09C 1/005; B09C 2101/00; A01B 1/243; C02F 3/02
See application file for complete search history.

(56) References Cited

U.S. PATENT DOCUMENTS 4,882,071 A * 11/1989 Bench .................... B09C 1/005
                                                                   159/903
4,943,305 A * 7/1990 Bernhardt .......... B01D 19/0005
                                                                  202/201
(Continued)

FOREIGN PATENT DOCUMENTS

CN        102633365        8/2012
CN        103864220        6/2014
(Continued)

OTHER PUBLICATIONS

First Office Action for CN 201510130625.4, mailed Mar. 24, 2016, 9 pages (English translation included).
(Continued)

*Primary Examiner* — Frederick L Lagman
(74) *Attorney, Agent, or Firm* — Morrison & Foerster LLP

(57) ABSTRACT

In one aspect, the present disclosure involves a re-aeration device and re-aeration method for constructed wetland. In one aspect, the re-aeration device comprises a re-aeration pipe and a windmill. The re-aeration pipe has a tubular structure with openings at both ends; one end inserts into the wetland substrate, and the other end connects with the windmill for receiving and accelerating air flow. The re-aeration pipe may also contain several telescoped or parallel arranged pipes with openings at both ends as well as with different pipe diameters and lengths, which connect with the windmill to form the re-aeration device. The present disclosure also provides a method of re-aeration for constructed wetlands by using the above-mentioned device. The re-aeration device provided herein has features of being simple in structure, environment friendly, and low-cost. In one aspect, the re-aeration method is characterized as simple, practicable, energy-efficient, environment friendly, low-
(Continued)

cost, widely applicable, and having good effect and high performance on re-aeration.

13 Claims, 5 Drawing Sheets

(51) Int. Cl.
  *A01B 1/24*     (2006.01)
  *C02F 3/04*     (2006.01)
  *C02F 3/20*     (2006.01)
  *C02F 3/30*     (2006.01)
  *C02F 3/32*     (2006.01)
  *A01B 45/02*    (2006.01)

(52) U.S. Cl.
  CPC ............... *C02F 3/04* (2013.01); *C02F 3/205* (2013.01); *C02F 3/308* (2013.01); *C02F 3/327* (2013.01); *B01F 2003/063* (2013.01); *B09C 2101/00* (2013.01); *C02F 2203/006* (2013.01); *Y02W 10/15* (2015.05); *Y02W 10/18* (2015.05); *Y02W 10/33* (2015.05)

(56) References Cited

U.S. PATENT DOCUMENTS

| | | | | |
|---|---|---|---|---|
| 5,380,126 A * | 1/1995 | Bernhardt | ........... | B01F 3/04262 166/306 |
| 5,549,828 A * | 8/1996 | Ehrlich | ........... | C02F 3/06 210/170.06 |
| 5,565,096 A * | 10/1996 | Phelan | ........... | A01K 63/042 210/150 |
| 5,570,973 A * | 11/1996 | Hunt | ........... | B09C 1/002 166/246 |
| 5,626,437 A * | 5/1997 | Hunt | ........... | B09C 1/002 210/610 |
| 5,855,775 A * | 1/1999 | Kerfoot | ........... | B01F 3/04262 210/170.07 |
| 6,258,273 B1 * | 7/2001 | Gee | ........... | B09C 1/00 210/170.07 |
| 6,284,133 B1 * | 9/2001 | Schaefer | ........... | B01F 3/04262 210/170.05 |
| 6,428,694 B1 * | 8/2002 | Brown | ........... | B09C 1/00 210/143 |
| 6,447,682 B1 * | 9/2002 | Flowers | ........... | C02F 3/302 210/170.09 |

FOREIGN PATENT DOCUMENTS

| | | | |
|---|---|---|---|
| CN | 204324977 U * | 5/2015 | |
| DE | 10118843 A1 * | 10/2002 | ............... A01B 1/06 |

OTHER PUBLICATIONS

Second Office Action for CN 201510130625.4, mailed Sep. 12, 2016, 8 pages (English translation included).
International Written Opinion for PCT/CN2015/081428, mailed Dec. 11, 2015, 5 pages (English translation included).

* cited by examiner

DEVICE AND METHOD THEREOF FOR RE-AERATION OF WETLANDS

CROSS-REFERENCE TO RELATED APPLICATIONS

This application claims priority to Chinese Patent Application No. 201510130625.4, entitled "A re-aeration device for constructed wetlands and re-aeration method thereof," filed on Mar. 24, 2015, the content of which is incorporated by reference herein in its entirety for all purposes.

TECHNICAL FIELD

The present application generally relates to the field of ecological engineering, and in particular aspects, a re-aeration device for a wetland (such as a constructed wetland) and re-aeration method thereof.

BACKGROUND

As one type of constructed wetlands, a subsurface flow wetland exerts synergistic effects of physical, chemical and biological purification of the substrate due to its small-scale land occupation. Subsurface flow wetland is efficient in removing organic matter and nutrients (such as nitrogen and phosphorus nutrients) in sewage, and greatly enhances sewage treatment capacity. Therefore, subsurface flow wetland is widely used in the practice of sewage treatment.

The oxygen content in the substrate of subsurface flow wetlands is relatively low, and oxygen is deficient inside the wetlands, which can easily result in lower removal rates for total nitrogen (TN), chemical oxygen demand (COD), and biochemical oxygen demand (BOD). Currently available solutions for this problem include inserting PVC pipes into the substrate of the wetlands in order to use the pressure difference created by water flow to increase re-aeration capacity of the substrate directly by the atmosphere. Another solution is by building a water-fall waterscape based on the terrain in order to increase the concentration of dissolved oxygen in the substrate of the wetlands. Although these methods have achieved good application effects, during the operation of subsurface flow wetlands, these current methods cannot generate a sufficient unit re-aeration amount of the substrate of subsurface flow wetlands to satisfy practical demands, due to the long hydraulic retention time and unstable water pressures. These limitations adversely affect the purification effects of subsurface flow wetlands. Yet another existing method delivers oxygen through PVC pipes inserted in the substrate by a blower device actuated by a motor. Although this method may satisfy practical demands and achieve better re-aeration effects than the methods using water pressure or water-fall waterscape, the cost thereof is relatively high and the implementing process thereof is complex. Because sufficient oxygen in the wetland substrate is one of the main factors increasing the purification efficiency by the wetlands, there is an urgent need to increase efficiency of re-aeration of the substrate and reduce the corresponding cost in order to keep the sustainable operation of the constructed wetlands. There is no report about such technique currently.

SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

In one aspect, provided herein is a re-aeration device for a wetland, comprising a re-aeration pipe and a windmill In one embodiment, the re-aeration pipe comprises a tubular structure comprising an opening at both ends, one end being an inserting end for inserting into a substrate of the wetland and transporting air through the re-aeration pipe to the substrate, and the other end being a free end for receiving the air; and said windmill comprises a plurality of fan blades configured to rotate and change air flow direction. In one embodiment, the device further comprises an interactional link component between the free end and the windmill for fixing the windmill on the free end of the re-aeration pipe, and the link component facilitates the windmill to draw air into the re-aeration pipe.

In one embodiment, the free end receives air from the atmosphere. In another embodiment, the windmill is driven by natural wind.

In one aspect, the link component comprises a holder welded onto the free end of the re-aeration pipes and a vertical shaft connecting the windmill with the holder.

In one aspect, the re-aeration pipe comprises one or more inner pipes.

In one aspect, one end of each inner pipe is a free end, and the other end of the inner pipe is an inserting end. In one aspect, the outermost re-aeration pipe and the one or more inner pipes have different lengths for inserting into the substrate at different depths, such that air entering each pipe is transported to different depths of the wetland substrate.

In one aspect, the one or more inner pipes are arranged in parallel. In one aspect, the outermost re-aeration pipe and the one or more inner pipes are coaxially telescoped and space is provided between the adjacently telescoped pipes for air flow.

In one aspect, the lengths of the inner pipes increase successively from the outermost inner pipe to the innermost inner pipe. In one aspect, the re-aeration pipe is manufactured by an unibody process. In one aspect, the device comprises a plurality of windmills.

In one aspect, the device comprises a link component comprising a holder welded onto the free end of the re-aeration pipes and a vertical shaft connecting the windmill with the holder. In one aspect, the re-aeration pipe comprises one or more inner pipes, one end of each inner pipe is a free end, and the other end of each inner pipe is an inserting end. In one aspect, the outermost re-aeration pipe and the one or more inner pipes have different lengths for inserting into the substrate at different depths, such that air entering each pipe is transported to different depths of the wetland substrate. In one aspect, the one or more inner pipes are arranged in parallel, or the outermost re-aeration pipe and the one or more inner pipes are coaxially telescoped and space is provided between the adjacently telescoped pipes for air flow. In one aspect, the lengths of the inner pipes increase successively from the outermost inner pipe to the innermost inner pipe. In one aspect, the re-aeration pipe is manufactured by an unibody process. In one embodiment, the device comprises a plurality of windmills.

In another aspect, provided herein is a re-aeration method for a constructed wetland, comprising inserting the inserting end of the re-aeration pipe of the re-aeration device of any of the preceding embodiments into the substrate of a wetland.

In one aspect, provided herein is a re-aeration device for constructed wetlands, characterized in that the device comprises a re-aeration pipe and a windmill. In one embodiment, the re-aeration pipe has a tubular structure with openings at both ends. In any of the preceding embodiments, one end can be an inserting end for inserting into the wetland substrate and transporting air through the pipe into the wetland substrate. In any of the preceding embodiments, the other end can be a free end for receiving air. In any of the preceding embodiments, an interactional link component can be set between the free end and the windmill for fixing the windmill on the free end of the re-aeration pipe. In any of the preceding embodiments, interaction of the link component can be conducive for the windmill to draw air into the re-aeration pipe under the drive of natural wind. In any of the preceding embodiments, the windmill can comprise a structure with several fan blades which can rotate and change the flow direction of natural wind.

In any of the preceding embodiments, the link component can comprise a holder welded onto the free end of the re-aeration pipes and a vertical shaft of the windmill connected with the holder.

In any of the preceding embodiments, the re-aeration pipe can comprise several inner pipes. In any of the preceding embodiments, one end of the inner pipe can be a free end. In any of the preceding embodiments, the free ends of the several inner pipes can form the free end of the re-aeration pipe. In any of the preceding embodiments, the other end of the inner pipe can be an inserting end. In any of the preceding embodiments, the inserting ends of several said inner pipes can form the inserting end of the re-aeration pipe.

In any of the preceding embodiments, the several inner pipes can be arranged in such a manner that each inner pipe has a different length at the inserting end of the re-aeration pipe. In any of the preceding embodiments, air entering each inner pipe can be transported to a different depth of the wetland substrate.

In any of the preceding embodiments, the inner pipes can be arranged in parallel. In any of the preceding embodiments, the inner pipes can be coaxially telescoped. In any of the preceding embodiments, there can be an interval between the adjacently telescoped inner pipes for air flow.

In any of the preceding embodiments, the lengths of the inserting ends of the inner pipes increase successively from the outermost inner pipe to the innermost inner pipe.

In any of the preceding embodiments, the re-aeration pipe can be manufactured by an unibody process. In any of the preceding embodiments, the device can have one or several windmills.

In any of the preceding embodiments, the re-aeration pipe can comprise several inner pipes. In any of the preceding embodiments, one end of the inner pipe can be a free end. In any of the preceding embodiments, the free ends of the several inner pipes can form the free end of the re-aeration pipe. In any of the preceding embodiments, the other end of the inner pipe can be an inserting end. In any of the preceding embodiments, the inserting ends of the several inner pipes can form the inserting end of the re-aeration pipe.

In any of the preceding embodiments, the several inner pipes can be arranged such that each inner pipe has a different length at the inserting end of the re-aeration pipe. In any of the preceding embodiments, air entering each inner pipe can be transported to a different depth of the wetland substrate.

In any of the preceding embodiments, the inner pipes can be arranged in parallel. In any of the preceding embodiments, the inner pipes can be coaxially telescoped. In any of the preceding embodiments, there can be an interval between the adjacently telescoped inner pipes for air flow.

In any of the preceding embodiments, the lengths of the inserting ends of the inner pipes increase successively from the outermost inner pipe to the innermost inner pipe. In any of the preceding embodiments, the re-aeration pipe can be manufactured by an unibody process. In any of the preceding embodiments, the device can have one or several windmills.

In another aspect, disclosed herein is a re-aeration method for constructed wetlands, characterized in that the inserting ends of re-aeration pipes of the re-aeration device of any of the preceding embodiments are inserted into the wetland substrate.

Figure 1:
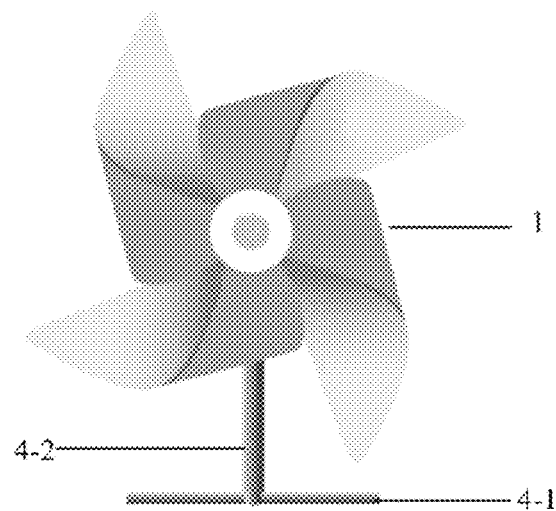
FIG. 1 is a schematic showing a windmill of a re-aeration device according to one aspect the present disclosure.

1—a windmill; 2—a re-aeration pipe; 3—the free end of a re-aeration pipe; 4—a link component; 4-1—a holder; 4-2—a vertical shaft; 5—the inserting end of a re-aeration pipe; 6—an inner pipe; 6-1—the free end of the inner pipe; 6-2—the inserting end of the inner pipe.

DETAILED DESCRIPTION

A detailed description of one or more embodiments of the claimed subject matter is provided below along with accompanying figures that illustrate the principles of the claimed subject matter. The claimed subject matter is described in connection with such embodiments, but is not limited to any particular embodiment. It is to be understood that the claimed subject matter may be embodied in various forms, and encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure, or manner. Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

All publications referred to in this application are incorporated by reference in their entireties for all purposes to the same extent as if each individual publication were individually incorporated by reference.

All headings are for the convenience of the reader and should not be used to limit the meaning of the text that follows the heading, unless so specified.

As used herein and in the appended claims, the singular forms "a," "an," and "the" include plural referents unless the context clearly dictates otherwise. For example, "a" or "an" means "at least one" or "one or more." Thus, reference to "a pipe" refers to one or more pipes, and reference to "the method" includes reference to equivalent steps and methods disclosed herein and/or known to those skilled in the art, and so forth.

It is understood that aspects and embodiments of the disclosure described herein include "consisting" and/or "consisting essentially of" aspects and embodiments.

To overcome deficiencies of existing methods of re-aeration, in one aspect, the present disclosure aims to provide a simple, practical, low-cost, and energy-efficient re-aeration device and method that fully utilize natural wind energy.

In one aspect, provided herein is a re-aeration device for wetlands, such as natural wetlands or constructed wetlands, characterized in that the device comprises a re-aeration pipe and a windmill. In another aspect, the re-aeration pipe comprises a tubular structure comprising one or more openings at both ends. In one aspect, one end of the re-aeration pipe is the inserting end for inserting into the wetland substrate and transporting air through the re-aeration pipe into the wetland substrate. In another aspect, the other end of the re-aeration pipe is a free end for receiving air, for example, from an air source such as the atmosphere.

In one aspect, one or more interactional link components are provided between the free end of the re-aeration pipe and the windmill for fixing the windmill on the free end. In one aspect, the link component is conducive for the windmill to draw air into the re-aeration pipe, for example, the windmill can be driven by nature wind to force air into the re-aeration pipe.

In one aspect, the windmill comprises a structure which can rotate and change flow direction of nature wind. For example, the windmill can comprise at least two fan blades.

In one aspect, the link component comprises a holder welded onto the free end of the re-aeration pipe. In another aspect, the link component comprises a vertical shaft connecting the windmill with the holder.

In one aspect, the device comprises the re-aeration pipe and one or more inner pipes. In some aspects, one end of the inner pipe is a free end comprising one or more openings, for example, connected to an air source such as the atmosphere. In one aspect, the free ends of the inner pipes form the free end of the re-aeration pipe. In another aspect, the other end of the inner pipe is an inserting end, for example, for inserting into the substrate of a wetland. In some aspects, the inserting ends of the inner pipes form the inserting end of the re-aeration pipe.

In one aspect, the wetland substrate has multiple layers at different depths, and the inner pipe or inner pipes are arranged such that each inner pipe has a different length from each other and from the re-aeration pipe, and each pipe can reach a different layer of the substrate. This way, air entering each pipe can be transported into a different depth of the wetland substrate.

In one aspect, the inner pipes are arranged in parallel. In another aspect, the inner pipes are coaxially telescoped. In yet another aspect, there is space between the adjacently telescoped inner pipes for air flow. In still another aspect, the depths that the inserting ends of the inner pipes can reach increase successively from the outermost inner pipe to the innermost inner pipe.

In one aspect, the device, including the re-aeration pipe and inner pipes, are manufactured using an unibody process. In one aspect, the device comprises one or more windmills.

In another aspect, provided herein is a re-aeration method for a wetland, such as constructed wetlands. In one aspect, the method comprises inserting the inserting ends of the re-aeration pipe of the re-aeration device according to any of the embodiments disclosed herein into the substrate of the wetland.

In one aspect, provided herein is a re-aeration device for a wetland, such as a constructed wetland, the device comprising a re-aeration pipe and a windmill. In one aspect, the re-aeration pipe has a tubular structure with openings at both ends, one end being an inserting end for inserting into the wetland substrate and transporting air through the pipe into the wetland substrate, and the other end being a free end for receiving air. In one aspect, the device further comprises an interactional link component set between the free end and the windmill for fixing the windmill on the free end of the re-aeration pipe. In one aspect, interaction of the link component is conducive to forcing or drawing air into the re-aeration pipe by the windmill, for example, driven by natural wind. In one aspect, the windmill comprises a structure comprising several fan blades which can rotate and change the flow direction of natural wind, for example, into the re-aeration pipe. When using, one end of the re-aeration pipe is inserted into a wetland substrate and the other end is exposed to air and connected to the windmill. Compared with art devices, in some aspects, the present device has several advantages. First, accelerated air flow is generated by the rotation of the windmill driven by natural wind, and is transported or forced into the re-aeration pipe. Therefore, the device increases the quantity of air that is delivered to the substrate of the constructed wetlands in unit time (e.g., volume of air per minute), and the concentration of dissolved oxygen per unit volume in the wetland substrate is also increased as a result. This way, the efficiency and capacity of re-aeration of the constructed wetlands can be significantly improved by the present device and method.

In one aspect, the windmill herein comprises a structure comprising several fan blades that can rotate and direct air such natural wind into the re-aeration pipe.

In one aspect, the present disclosure also provides a re-aeration pipe that comprises several coaxial telescoped and/or parallel-arranged inner pipes. In one aspect, the inner pipes are arranged such that the inserting end of each pipe (the re-aeration pipe and the inner pipes) can reach a different depth in the wetland substrate. For example, each inner pipe can have a different length, which facilitates transport of air into different depths of the wetland substrate. In one aspect, the inserting end of each inner pipe of the re-aeration pipe may be set according to the different oxygen needs of each wetland substrate layer, in order to ensure each substrate layer is provided with sufficient re-aeration, and obtain better re-aeration effect of the constructed wetland as a whole. The arrangement mode of the inner pipes can be varied. For example, there may be several independent pipes with one end of the pipes aligned and the other end of the pipes having different lengths, and the pipes are assembled to form a bunch for use in re-aeration. The inner pipes may be made using a unibody process.

In one aspect, the inner pipes are coaxial telescoped and there is an interval between the adjacently telescoped inner pipes providing space for air flow. In one aspect, from the outermost inner pipe to the innermost inner pipe, each pipe reaches a deeper layer of the wetland substrate because the lengths of the pipes increase successively. In one aspect, it is convenient to insert the device into a wetland substrate. In one aspect, the device can be manufactured by an unibody process, which is conducive to the promotion and wide application of the device.

In one aspect, provided herein is a windmill-based re-aeration device for constructed wetlands. In one aspect, the device can accelerate air flow by the windmill, providing improved speed and capacity for re-aeration of the subsurface flow wetland substrate, increased concentration of dissolved oxygen per unit volume in the substrate, and enhanced purifying capacity of the subsurface flow wetland. This in turn effectively decreases pollutant concentrations in the wetland, prolongs service life of the constructed wetlands, and assures good effluent effect of the constructed wetlands. In one aspect, features of the re-aeration device provided herein includes a simple structure and low-cost, and in addition, the re-aeration method using this device is simple, practical, energy-efficient, environment friendly, and widely applicable, and has good effect and high performance on re-aeration.

The following is a further detailed explanation with referenced to the embodiments and drawings, but the scope of the present disclosure is not to be limited by the embodiments.

EXAMPLE 1

Re-aeration Device No. 1

Figure 2:
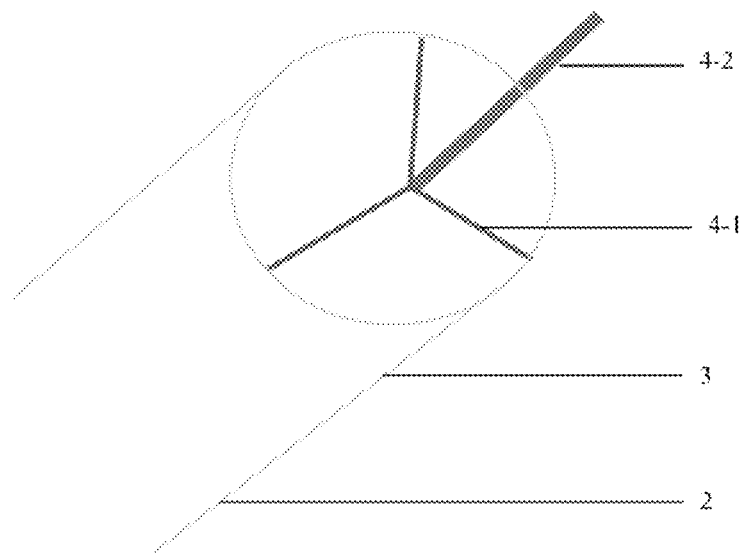
FIG. 2 is a schematic showing the structure of a link component of a re-aeration device according to one aspect the present disclosure.

Re-aeration device No. 1 for constructed wetlands in this example is described with reference to FIGS. 1-3. In one aspect, the re-aeration device comprises a windmill and a re-aeration pipe, and FIG. 1 shows the structure of the windmill (1). In a specific example, the number of the windmill can be one. In one aspect, the re-aeration pipe (2) has a tubular structure with openings at both ends. The end inserted and fixed into the substrate of the constructed wetland is the inserting end (5), which is used for delivering air through the re-aeration pipe into the wetland substrate. The other end is a free end (3) for receiving air and in one aspect is exposed to air for receiving air. As shown in FIG. 2, an interactional link component is set between the free end of the re-aeration pipe and the windmill for fixing the windmill on the free end. In one aspect, interaction of the link component (4) is conducive for the windmill (1) to draw air (e.g., natural air) into the re-aeration pipe (2), and the windmill is driven by natural wind or air flow. In this example, the link component (4) comprises a holder (4-1) welded onto the free end (3) of the re-aeration pipe (2), and a vertical shaft (4-2) connecting the windmill (1) with the holder (4-1). In one aspect, the windmill driven by natural wind or air flow rotates within a plane, and the re-aeration pipe is substantially on the plane, such that wind or air is forced into the re-aeration pipe. In some aspects, the re-aeration pipe is substantially on the plane when the angle between the re-aeration pipe and the plane is less than about 0.01 degrees, less than about 0.1 degrees, less than about 1 degree, or less than about 2, 3, 4, 5, 6, 7, 8, 9 or 10 degrees, or less than about 15, 20, 25, 30, 35, 40, or 45 degrees.

Figure 3:
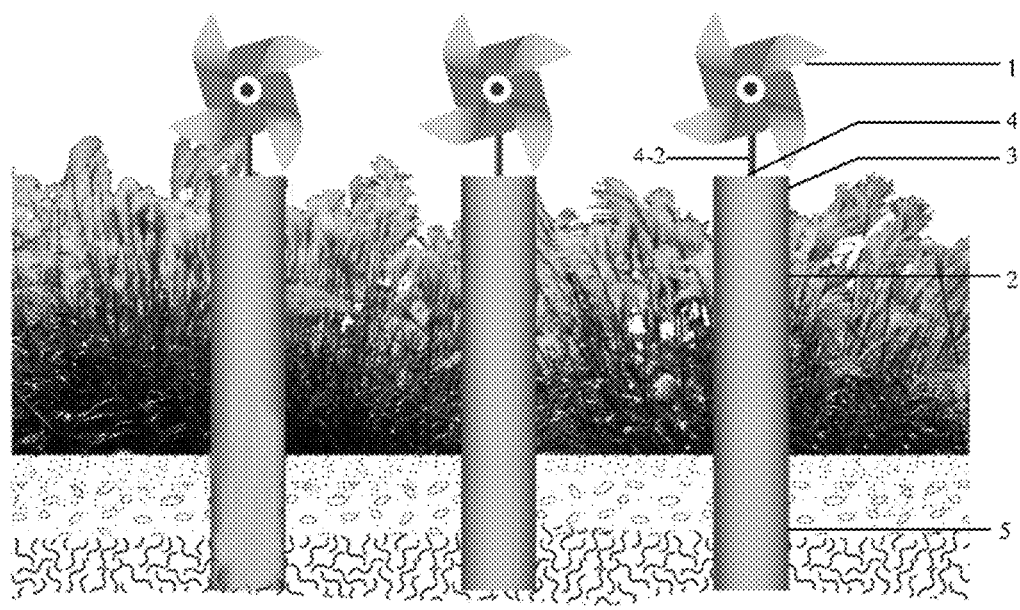
FIG. 3 is a schematic showing the implementation of a re-aeration device according to Example 1 in a constructed wetland.

In one aspect, the re-aeration device in this example is used for the re-aeration of a constructed wetland, as shown in FIG. 3. Specifically, the inserting end (5) of the re-aeration device is inserted into the substrate. The windmill (1) which is fixed on the top of the free end (3) of the re-aeration pipe (2) is driven by the force of natural wind to spin. With the rotation of the windmill (1), air around the windmill is transported into the wetland substrate through the re-aeration pipe (2) from the free end (3).

EXAMPLE 2

Re-aeration Device No. 2

Figure 4:
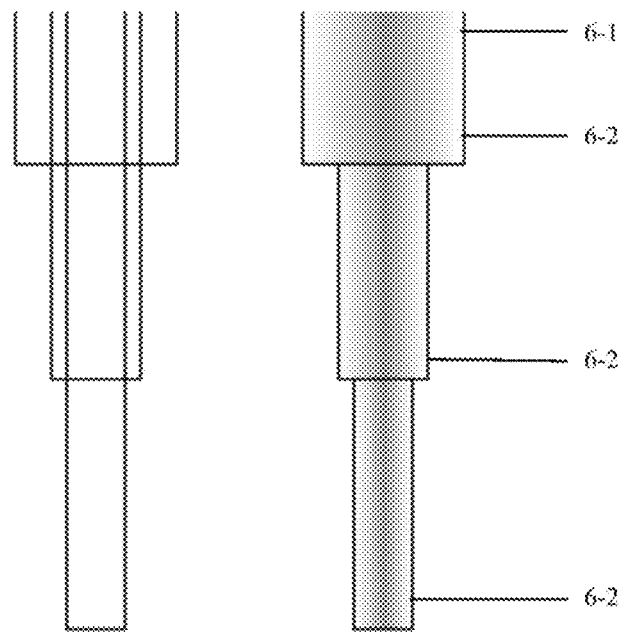
FIG. 4 is a schematic showing the structure of inner pipes of a re-aeration device according to Example 2.
Figure 5:
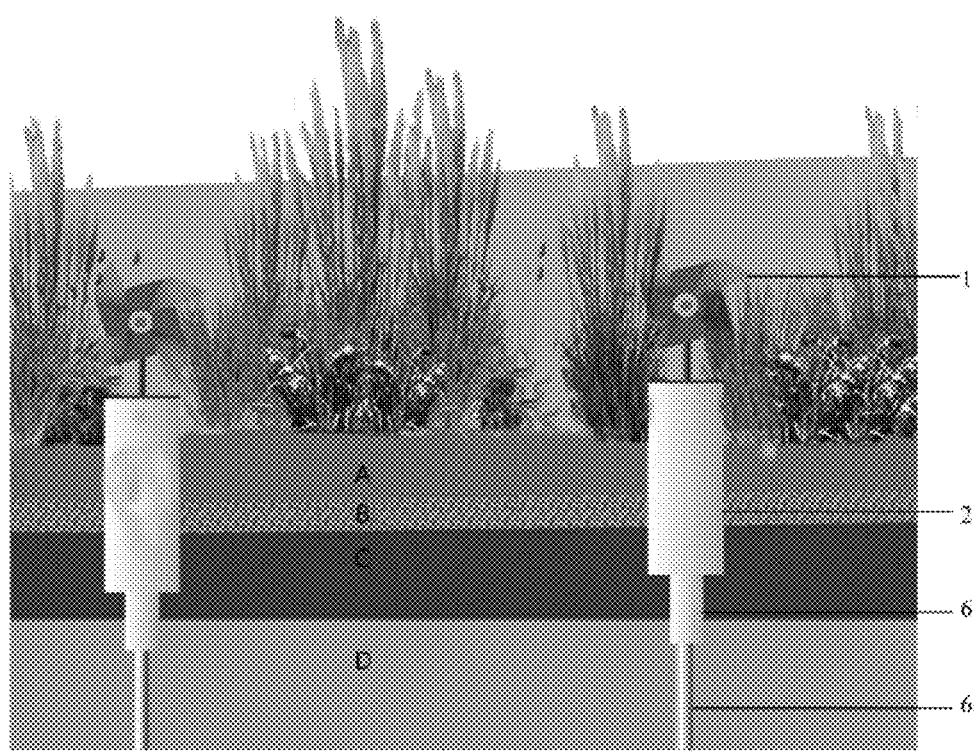
FIG. 5 is a schematic showing the implementation of a re-aeration device according to Example 2 in a constructed wetland.

Re-aeration device No. 2 for constructed wetlands in this example is described with reference to FIGS. 1, 4, and 5. In one aspect, the re-aeration device comprises a windmill and a re-aeration pipe, and FIG. 1 shows the structure of the windmill (1). In a specific example, the number of the windmill can be one. In one aspect, the re-aeration pipe (2) comprises one or more inner pipes (6) with openings at both ends, and the diameter and length of the one or more inner pipes can be varied from one another. In one aspect, the re-aeration pipe and the inner pipes are coaxial telescoped, and there is space between the adjacently telescoped inner pipes (and between the re-aeration pipe and the coaxial telescoped inner pipe closest to the re-aeration pipe) for air flow. In one aspect, from the outermost inner pipe to the innermost inner pipe, lengths of the inserting ends (6-2) of inner pipes (6) increase successively, as shown in FIG. 4. In one aspect, the device is manufactured by an integrally molding process. In one aspect, the device is manufactured by an unibody manufacturing process. In one aspect, the device can be easily inserted into a wetland substrate, and is environment-friendly as well as low-cost. Since each inner pipe (6) has a different length, its inserting end (6-2) can be designed to insert into a different layer of the substrate of a constructed wetland because the layers are at different depths in the substrate. As shown in FIG. 5, the inserting ends of the inner pipes of the re-aeration device are inserted into the substrate layers of different depths of the constructed wetland for high-efficiency re-aeration.

In one aspect, driven by forces from natural wind, the rotating blades of the windmill (1) transfer more air into inner pipes (6) of the re-aeration pipe (2). Inner pipes (6) have different pipe diameters from one another and are coaxial telescoped, and there is sufficient space between the adjacently telescoped inner pipes for air flow provided by the windmill (1). Since the inserting ends of the inner pipes have different lengths, air enters into the substrate layers at different depths through the inserting end located at each layer. This way, wetland substrate layers at different depths can have access to plenty of air for highly efficient re-aeration.

EXAMPLE 3

Re-aeration Device No. 3

Figure 6:
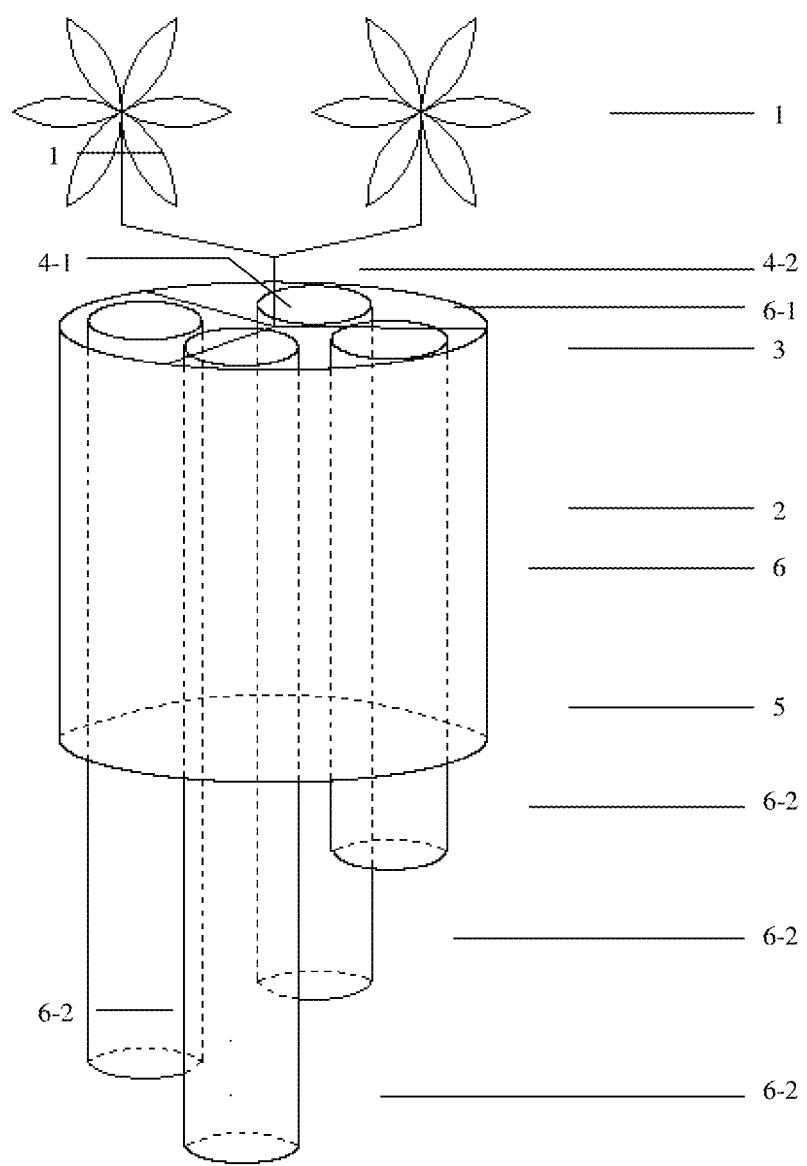
FIG. 6 is a schematic showing the structure of inner pipes of a re-aeration device according to Example 3.
Figure 7:
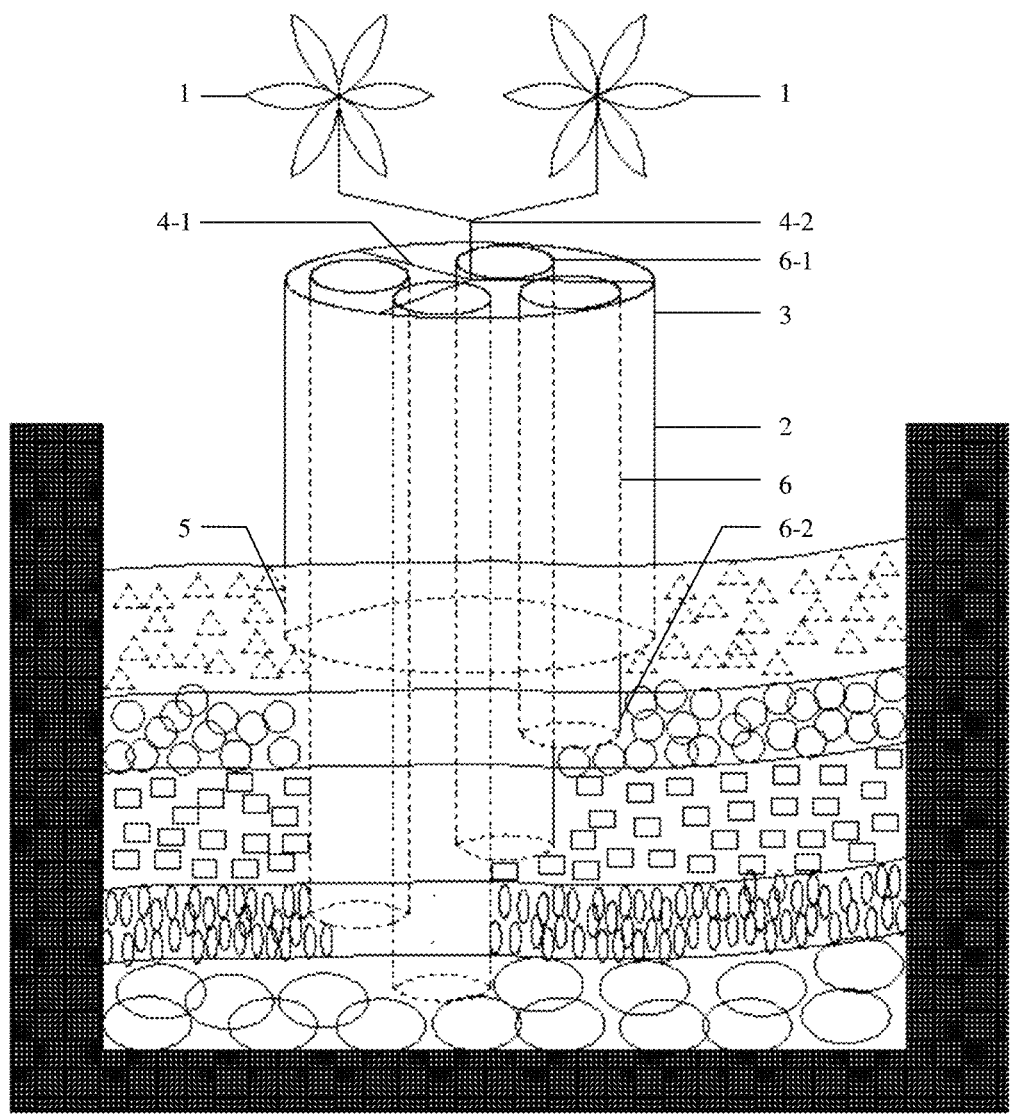
FIG. 7 is a schematic showing the implementation of a re-aeration device according to Example 3 in a constructed wetland.

Re-aeration device No. 3 for constructed wetlands in this example is described with reference to FIGS. 1, 6, and 7. In one aspect, the re-aeration device comprises a windmill and a re-aeration pipe, and FIG. 1 shows the structure of the windmill (1). In a specific example, the number of the windmill can be two, and the two windmills are set on the re-aeration pipe. In one aspect, the re-aeration pipe (2) comprises one or more inner pipes (6) with openings at both ends and with varying lengths. In one aspect, the inner pipes (6) are arranged in parallel, and there is space between the adjacently arranged inner pipes (and between the re-aeration pipe and the coaxial telescoped inner pipe closest to the re-aeration pipe) for air flow, as shown in FIG. 6. In one aspect, the device is manufactured by an unibody manufacturing process. In one aspect, the device can be easily inserted into a wetland substrate, and is environment-friendly as well as low-cost. Since each inner pipe (6) has a different length, its inserting end (6-2) can be inserted into a layer of the constructed wetland substrate at a particular depths, and different inner pipes can provide aeration to different layers, as shown in FIG. 7. Thus, air enters into the substrate layers at different depths through the inserting end located at each layer, and the substrate layers at different depths can have access to plenty of air for highly efficient re-aeration.

In one aspect, natural wind drives the rotating blades of the windmill to deliver air into inner pipes (6) of the re-aeration pipe (2). Inner pipes (6) have different lengths and are arranged in parallel, and there is sufficient space between the adjacently arranged inner pipes for air flow to reach the inserting ends of the re-aeration pipe and each inner pipe. Since the inserting ends of the inner pipes have different lengths, air enters into substrate layers at different depths through the inserting end located at each layer. This way, layers at different depths of the constructed wetland can get access to plenty air for highly efficient re-aeration.

The invention claimed is:

1. A re-aeration device for a wetland, comprising:
a re-aeration pipe, which comprises a tubular structure comprising an opening at both ends, one end being an inserting end for inserting into a substrate of the wetland and transporting air through the re-aeration pipe to the substrate, and the other end being a free end for receiving the air;
a windmill comprising a plurality of fan blades configured to rotate and change air flow direction; and
an interactional link component between the free end and the windmill for fixing the windmill on the free end of the re-aeration pipe,
wherein the link component comprises a holder welded onto the free end of the re-aeration pipes and a vertical shaft connecting the windmill with the holder, and
wherein the re-aeration pipe comprises an outermost re-aeration pipe and one or more inner pipes.

2. The re-aeration device of claim 1, wherein the outermost re-aeration pipe and the one or more inner pipes have different lengths for inserting into the substrate at different depths, such that air entering each pipe is transported to different depths of the wetland substrate.

3. The re-aeration device of claim 1, wherein the one or more inner pipes are arranged in parallel.

4. The re-aeration device of claim 1, wherein the outermost re-aeration pipe and the one or more inner pipes are coaxially telescoped and space is provided between the adjacently telescoped pipes for air flow.

5. The re-aeration device of claim 4, wherein the lengths of the inner pipes increase successively from the outermost inner pipe to the innermost inner pipe.

6. The re-aeration device of claim 4, wherein the re-aeration pipe is manufactured by a unibody process.

7. The re-aeration device of claim 1, wherein one end of each inner pipe is a free end, and the other end of each inner pipe is an inserting end.

8. The re-aeration device of claim 7, wherein the outermost re-aeration pipe and the one or more inner pipes have different lengths for inserting into the substrate at different depths, such that air entering each pipe is transported to different depths of the wetland substrate.

9. The re-aeration device of claim 7, wherein the one or more inner pipes are arranged in parallel, or the outermost re-aeration pipe and the one or more inner pipes are coaxially telescoped and space is provided between the adjacently telescoped pipes for air flow.

10. The re-aeration device of claim 9, wherein the lengths of the inner pipes increase successively from the outermost inner pipe to the innermost inner pipe.

11. The re-aeration device of claim 9, wherein the re-aeration pipe is manufactured by a unibody process.

12. The re-aeration device of claim 1, wherein the device comprises a plurality of windmills.

13. A re-aeration method for a constructed wetland, comprising inserting the inserting end of the re-aeration pipe of the re-aeration device of claim 1 into the substrate of a wetland.

* * * * *